US010795616B1

United States Patent
Zhang et al.

(10) Patent No.: US 10,795,616 B1
(45) Date of Patent: Oct. 6, 2020

(54) LOCAL PRINTING OF PRINT DATA GENERATED DURING NESTED REMOTE DESKTOP SESSIONS

(71) Applicant: VMware, Inc., Palo Alto, CA (US)

(72) Inventors: Hui Zhang, Beijing (CN); Weigang Huang, Beijing (CN); Mangui She, Beijing (CN); Hui Yuan, Beijing (CN); Kun Shi, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/424,033

(22) Filed: May 28, 2019

(51) Int. Cl.
*G06F 3/12* (2006.01)

(52) U.S. Cl.
CPC .......... *G06F 3/1205* (2013.01); *G06F 3/1226* (2013.01); *G06F 3/1289* (2013.01)

(58) Field of Classification Search
None
See application file for complete search history.

(56) References Cited

U.S. PATENT DOCUMENTS

| | | | | |
|---|---|---|---|---|
| 6,614,549 B1* | 9/2003 | Hlava | ................... | G06F 3/1204 358/1.1 |
| 8,149,431 B2* | 4/2012 | Barton | .................. | G06F 3/1289 358/1.1 |
| 2001/0013948 A1* | 8/2001 | Fujiwara | ................ | B41J 29/393 358/1.15 |
| 2010/0031261 A1* | 2/2010 | Morita | ............... | H04N 1/00222 718/100 |
| 2012/0226742 A1* | 9/2012 | Momchilov | .......... | G06F 3/1454 709/203 |
| 2012/0307293 A1* | 12/2012 | Natori | ................... | G06F 3/1205 358/1.15 |

OTHER PUBLICATIONS

VMware, Inc. "Virtual Printing Solutions with View in Horizon 7," Technical White Paper, Jun. 2017, 23 pages.

* cited by examiner

*Primary Examiner* — Thomas D Lee
(74) *Attorney, Agent, or Firm* — Kim & Stewart LLP

(57) ABSTRACT

Printing performance is improved during a nested remote desktop session, in which a client computing device has established a first remote desktop session with a first virtual machine that has established a second remote desktop session with a second virtual machine. When print data is generated by the second virtual machine and transmitted to the first virtual machine, upon receipt of the print data by the first virtual machine, the first virtual machine determines whether or not the print data can be handled by the first virtual machine. Upon determining that the print data cannot be handled by the first virtual machine, the first virtual machine transmits the print data to the client computing device without issuing a print instruction to print the print data locally at the first virtual machine.

20 Claims, 4 Drawing Sheets

LOCAL PRINTING OF PRINT DATA GENERATED DURING NESTED REMOTE DESKTOP SESSIONS

BACKGROUND

Many organizations rely on remote desktop services (RDS) to provide them with lean, flexible computing environments. Remote desktop printing is one important feature required by the end user of RDS. When the destination of remote desktop printing is a client-side printer, processing of print commands issued during nested remote desktop sessions, where a second remote desktop session is established within a first remote desktop session, becomes complicated and less efficient.

SUMMARY

One or more embodiments improve printing performance during a nested remote desktop session, in which a client computing device has established a first remote desktop session with a first virtual machine that has established a second, nested, remote desktop session with a second virtual machine. When print data is generated by the second virtual machine and transmitted to the first virtual machine, upon receipt of the print data by the first virtual machine, the first virtual machine determines whether or not the print data can be handled by the first virtual machine. Upon determining that the print data cannot be handled by the first virtual machine, the first virtual machine transmits the print data to the client computing device without issuing a print instruction to print the print data locally at the first virtual machine.

Further embodiments of the present invention include a non-transitory computer readable storage medium that includes instructions that enable a processing unit to implement one or more aspects of the above method, as well as a remote desktop system configured to implement one or more aspects of the above method.

DETAILED DESCRIPTION

Figure 1:
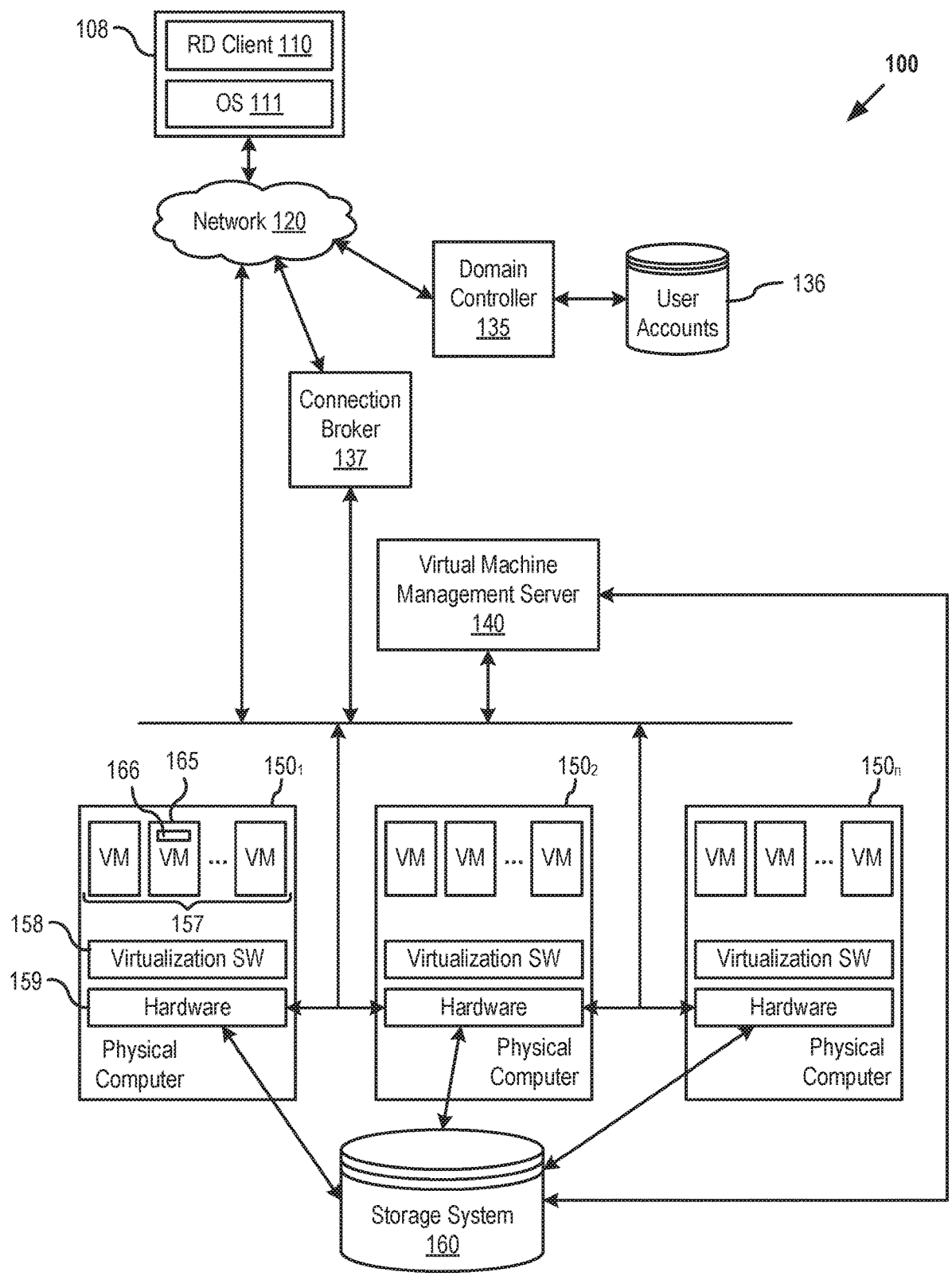
FIG. 1 illustrates components of a virtualized desktop infrastructure system in which a printing process according to one or more embodiments may be carried out.

FIG. 1 illustrates components of a virtualized desktop infrastructure (VDI) system 100 (also referred to as a remote desktop computer system) in which printing according to one or more embodiments may be carried out. In VDI system 100, remote desktop client software programs (also referred to as "RD clients" for short) run on operating systems of local computing devices. In the embodiment illustrated in FIG. 1, RD client 100 runs on top of operating system (OS) 111 of client device 108. RD clients provide an interface for the users to access their desktops, which may be running in one of virtual machines 157 or blade server (not shown) in a data center that is remote from the user locations. The term "desktop" refers to the instance of an interactive operating environment provided by a computer operating system and software applications, typically in the form of a display and sound output and keyboard and mouse input. With RD clients, users can access desktops running in a remote data center through network 120, from any location, using a general purpose computer running a commodity operating system and a RD client software program such as VMware® View™, or a special purpose thin client such as those available from Dell, HP, NEC, Sun Microsystems, Wyse, and others.

VDI system 100 includes a domain controller 135, such as Microsoft® Active Directory®, that manages user accounts 136 including user log-in information, and a connection broker 137 that manages connections between RD clients and desktops running in virtual machines 157 or other platforms. Domain controller 135 and connection broker 137 may run on separate servers or in separate virtual machines running on the same server or different servers. In the embodiments of the present invention illustrated herein, desktops are running in virtual machines 157 and virtual machines 157 are instantiated on a plurality of physical computers 1501, 1502, . . . , 150n, each of which includes virtualization software 158 and hardware 159, is controlled by a virtual machine management server 140, and is coupled to a shared persistent storage system 160.

A particular configuration of the virtualized desktop infrastructure is described above and illustrated in FIG. 1, but it should be recognized that one or more embodiments may be practiced with other configurations of the virtualized desktop infrastructure.

Figure 2:
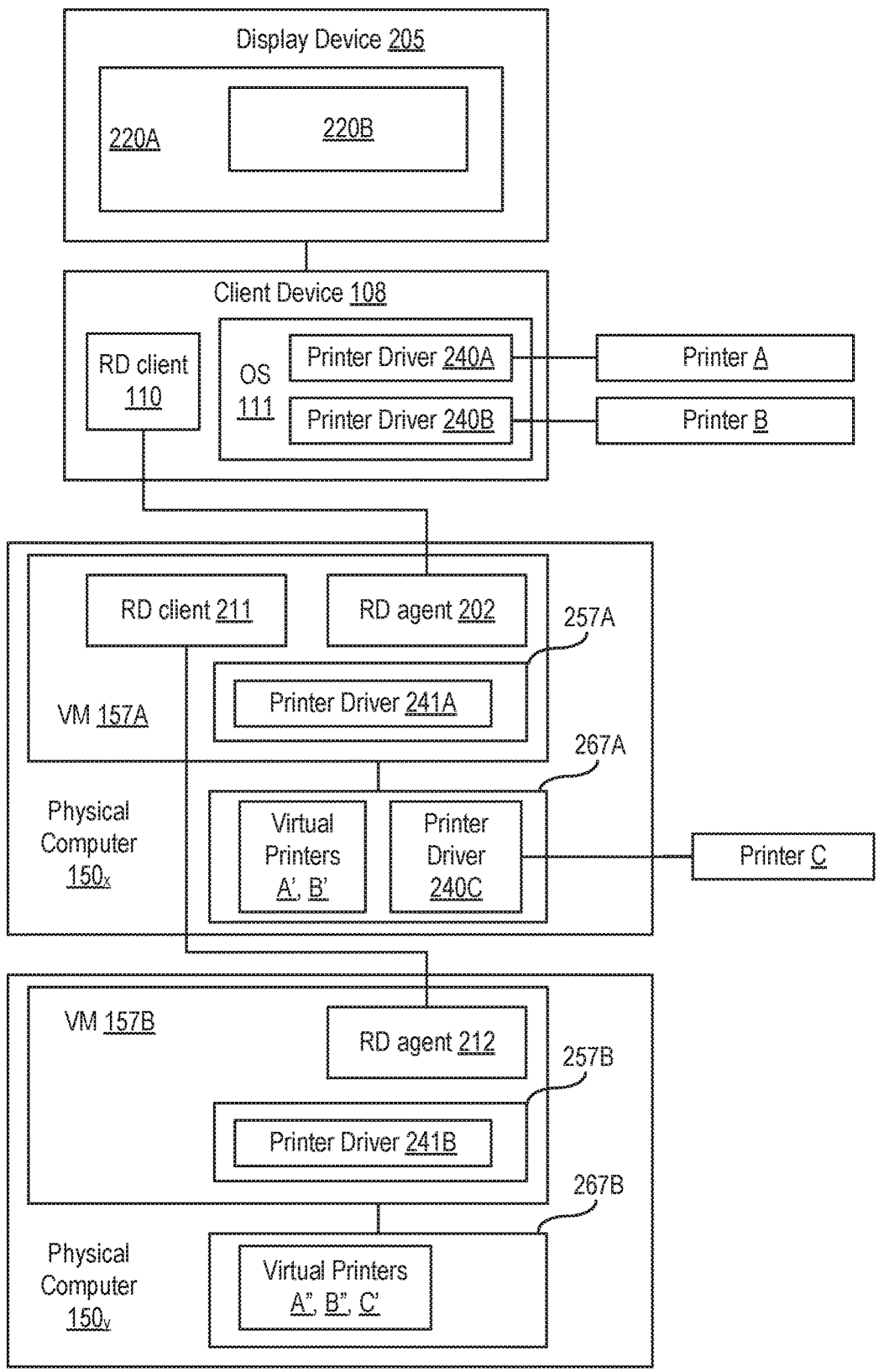
FIG. 2 is a conceptual diagram that illustrates components that establish a nested remote desktop session within which a printing process according to one or more embodiments may be carried out.

FIG. 2 is a conceptual diagram that illustrates components that establish a nested remote desktop session within which a printing process according to one or more embodiments may be carried out. Three physical machines are shown in FIG. 2. They are client device 108, physical computer 150x, and physical computer 150y, where x and y are any number from 1 to n. The numbers x and y may be the same or different and, in the embodiment illustrated in FIG. 2, they are different.

Client device 108 has installed therein RD client 110 by which a user accesses his or her remote desktop in accordance with the steps described below in conjunction with FIG. 3. In the embodiments described herein, remote desktops are hosted in virtual machines running in physical machines. Virtual machine 157A hosts a remote desktop 220A that is accessed through RD client 110. Virtual machine 157A has a remote desktop agent 202 ("RD agent" for short) running therein, which communicates with RD client 110 to establish the session for remote desktop 220A. An image of remote desktop 220A is generated in virtual machine 157A and transmitted by RD agent 202 to RD client 110, and client device 108 displays the image of remote desktop 220A on a display device 205 of client device 108.

Virtual machine 157A also has installed therein RD client 211 by which the user can access another remote desktop (e.g., remote desktop 220B) from remote desktop 220A in accordance with the steps described below in conjunction with FIG. 3. Launching of remote desktop 220B from within remote desktop 220A establishes a nested session (i.e., a session within a session). In one example implementation, remote desktop 220A is a personal desktop of a user and remote desktop 220B is a desktop that different users can log into from their personal desktop to access various applications installed thereon.

In the example given in FIG. 2, virtual machine 157B hosts remote desktop 220B and has RD agent 212 running therein, which communicates with RD client 211 to establish the nested session. An image of remote desktop 220B is generated in virtual machine 157B and transmitted by RD agent 212 to RD client 211. Then, virtual machine 157A generates a composite image of remote desktop 220A and remote desktop 220B, and the composite image is transmitted by RD agent 202 to RD client 110. A schematic representation of the composite image including remote desktop 220A and remote desktop 220B within remote desktop 220A is shown in FIG. 2.

Further in FIG. 2, printers A, B are shown locally attached to client device 108, and a printer C is shown locally attached to physical computer 150x. Each of printers A, B, C has a corresponding printer driver, printer drivers 240A, 240B, 240C, respectively. Printer drivers 240A, 240B are installed in OS 111 of client device 108. Printer driver 240C is part of virtualization software 267A of virtual machine 157A. In alternative embodiments, either or both printers A, B may be network printers that are accessible by client device 108 through printer drivers 240A, 240B, respectively, over a local area network. Accordingly, the term "locally attached" means directly attached via a printer cable or attached via a local area network.

When the session for remote desktop 220A is established, printers available to client device 108 are redirected to virtual machine 157A and are made available as virtual printers A', B' by virtualization software 267A of virtual machine 157A. A universal printer driver 241A is installed in a guest operating system 257A of virtual machine 157A to allow print jobs to be sent from within remote desktop 220A to virtual printers A', B' or to printer C through printer driver 240C. As a result, in the example of FIG. 2, printing destinations available from within remote desktop 220A include virtual printers A', B' and locally attached printer C.

Similarly, when the session for remote desktop 220B is established from within remote desktop 220A, printers available to virtual machine 157A are redirected to virtual machine 157B and are made available as virtual printers A", B", C' by virtualization software 267B of virtual machine 157B. A universal printer driver 241B is installed in a guest operating system 257B virtual machine 157B to allow print jobs to be sent from within remote desktop 220B to virtual printers A", B", C'. As a result, in the example of FIG. 2, printing destinations available from within remote desktop 220B include virtual printers A", B", C'.

The process of redirecting printers is further detailed in the technical white paper entitled "Virtual Printing Solutions with View in Horizon 7—VMware Horizon 7.x," June 2017, and the entire contents of this white paper are incorporated by reference herein.

Figure 3:
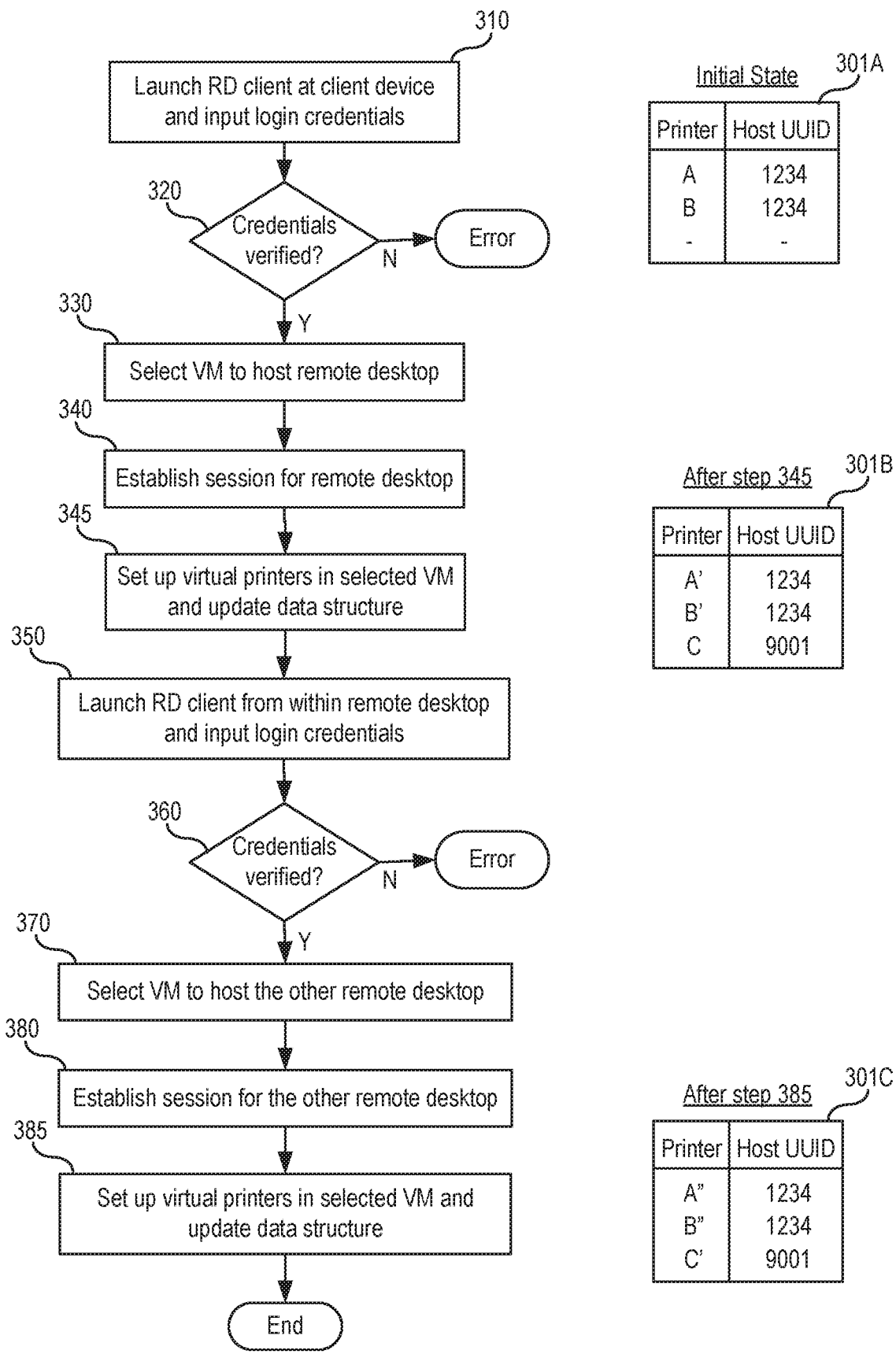
FIG. 3 is a flow diagram that illustrates steps of a method of establishing a nested remote desktop session in which a printing process according to one or more embodiments may be carried out.

FIG. 3 is a flow diagram that illustrates steps of a method of establishing a nested remote desktop session in which a printing process according to one or more embodiments may be carried out. In addition to the method steps, FIG. 3 also depicts a data structure that indicates for each virtual or physical printer available to client device 108, virtual machine 157A, and virtual machine 157B, a universally unique ID of the host (host UUID) that is hosting the corresponding physical printer. In the embodiments described herein, when a physical machine or a virtual machine hosts a printer, this means that the host machine (physical or virtual) can handle the print data locally, i.e., process the print data for printing by a printer that is locally attached to the host physical machine or to a physical computer in which the host virtual machine is running.

At the beginning of the process depicted in FIG. 3, it is assumed that printers A, B are locally attached to client device 108 and corresponding printer drivers 240A, 240B are installed in client device 108. Upon installation of the printer drivers, OS 111 updates data structure 301A to associate both printer A and printer B to the host UUID of client device 108 (in the example given, host UUID of client device 108=1234), because client device 108 is hosting both printer A and printer B.

At step 310, the user launches RD client 110 installed in client device 108 and inputs login credentials to log into his or her desktop. If the login credentials are verified at step 320, connection broker 137 at step 330 selects a virtual machine to host the user's remote desktop. Continuing with the example given in FIG. 2, virtual machine 157A is selected to host remote desktop 220A, and RD client 110 communicates with RD agent 202 to establish the session for remote desktop 220A (step 340). Upon establishing the session, RD client 110 communicates settings of printers available thereto to RD agent 202, and RD agent 202 makes them available as virtual printers within virtual machine 157A. In addition, RD client 110 transmits data structure 301A to RD agent 202, and RD agent 202 updates data structure 301A to add an entry for printer C which is locally attached to physical computer 150x and stores the updated data structure as data structure 301B in memory of virtual machine 157A (step 345). In the entry for printer C, the host UUID of virtual machine 157A is stored because virtual machine 157A is hosting printer C. In the example given, host UUID of virtual machine 157A=9001.

At step 350, the user launches RD client 211 from within remote desktop 220A and inputs login credentials to log into another remote desktop (in the example of FIG. 2, remote desktop 220B). If login credentials are verified at step 360, connection broker 137 at step 370 selects a virtual machine to host remote desktop 220B. Continuing with the example of FIG. 2, virtual machine 157B is selected to host remote desktop 220B, and RD client 211 communicates with RD agent 212 to establish the session for remote desktop 220B (step 380). Upon establishing the session, RD client 211 communicates settings of printers available thereto to RD agent 212, and RD agent 212 makes them available as virtual printers within virtual machine 157B. In addition, RD client 211 transmits data structure 301B to RD agent 212, and RD agent 212 stores the data structure as data structure 301C in memory of virtual machine 157B (step 385).

Data structure 301A described above provides an indication that the local printers available to client device 108 are each hosted by client device 108 because the host UUID associated with local printers A, B matches the host UUID of the client device 108. Similarly, data structure 301B described above provides an indication that the local printers available to virtual machine 157A are either hosted by virtual machine 157A or hosted by another machine, e.g., client device 108. Local printers A', B' are each hosted by another machine because the host UUID associated with local printers A', B' does not match the host UUID of virtual machine 157A. On the other hand, local printer C is hosted by virtual machine 157A because the host UUID associated with local printer C matches the host UUID of virtual machine 157A. Lastly, data structure 301C described above provides an indication that the local printers available to virtual machine 157B are all hosted by another machine, because the host UUID associated with any of local printers A", B", C' does not match the host UUID of virtual machine 157B.

Figure 4:
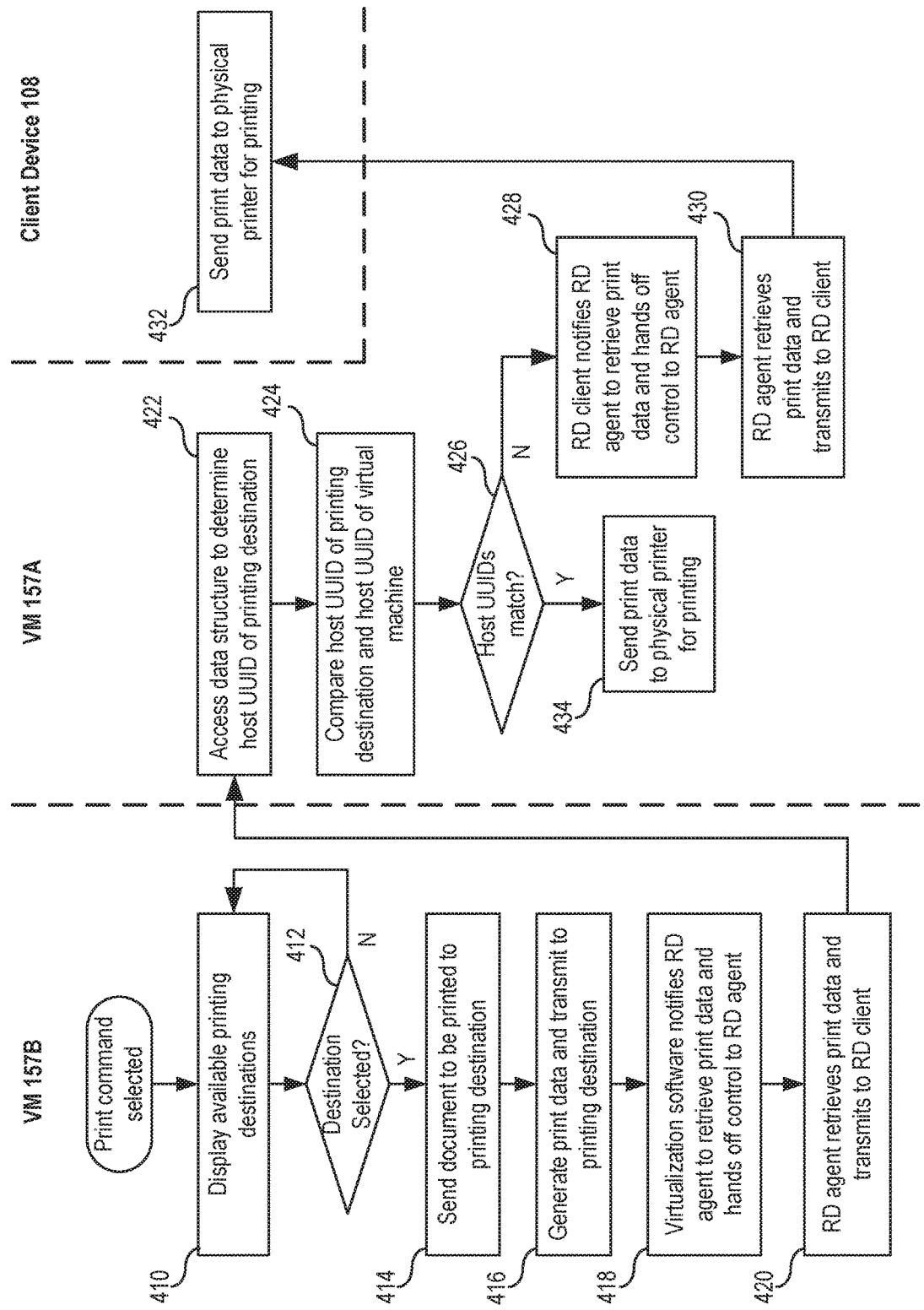
FIG. 4 is a flow diagram that illustrates steps of a method of printing according to one or more embodiments.

FIG. 4 is a flow diagram that illustrates steps of a method of printing according to one or more embodiments. In the example given herein, it is assumed that the method of printing is triggered by a user selecting a print command from within an application running on remote desktop 220B.

In response to the user selection of the print command from within an application running on remote desktop 220B, a screen for selecting a printing destination is displayed to the user (step 410). When the user selects a printing destination at step 412, the application at step 414 issues a print instruction to the printing destination. The printer driver for the printing destination (in this example, universal printer driver 241B) then generates print data and transmits the print data to the printing destination for printing (step 416).

Upon receiving the print data, virtualization software 267B notifies RD agent 212 to retrieve the print data at step 418 and hands off subsequent control of the printing process to RD agent 212. Then, RD agent 212 retrieves the print data and transmits the print data to RD client 211 (step 420).

Upon receipt of the print data from RD agent 212, RD client 211 determines whether or not the print data can be handled locally. To determine this, RD client 211 accesses data structure 301B to retrieve the host UUID of the printing destination (step 422) and then compares the host UUID of the printing destination with the host UUID of virtual machine 157A (step 424).

If the printing destination is A' or B', the host UUIDs do not match (i.e., a mismatch is determined at step 426, which means that the print data cannot be handled locally) and RD client 211 does not issue a print instruction to print the print data to the printing destination A' or B'. Instead, RD client 211 notifies RD agent 202 at step 428 to retrieve the print data and hands off subsequent control of the print process to RD agent 202. Then, RD agent 202 retrieves the print data and transmits the print data to RD client 110 (step 430). As a result, no print instruction is issued to the local printing devices of virtual machine 157A between a first point in time at which the print data is received by RD client 211 from RD agent 212 and a second point in time at which RD agent 202 transmits the print data to RD client 110, such that printer driver 241A does not operate on the print data between the first point in time and the second point in time.

Upon receipt of the print data from RD agent 202, RD client 110 at step 432 issues a print instruction to print the print data to the printing destination (printer A or B).

Referring back to step 426, if the printing destination is C, the host UUIDs match, which means that the printing destination is physical and is not virtual, and RD client 211 at step 434 issues a print instruction to print the print data to the printing destination (printer C).

Embodiments have been described above using the example of printer redirection. However, embodiments may be generally applied to any device redirection deployed across nested sessions. In such embodiments, data processing that is required for the device is bypassed in each of the intermediate nodes or levels that cannot handle the data, and the data is passed on to the next node or level until the data reaches the node or level that can handle it.

As used herein, a "connection broker" is any apparatus that is configured to manage connections to remote user sessions such as remote desktops, and a "domain controller" is any apparatus that is configured to have access to and manage user log-in information.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of processing print data to be printed at a printer attached locally to a client computing device that has established a first remote desktop session with a first virtual machine that has established a second, nested, remote desktop session with a second virtual machine, wherein the print data is generated by the second virtual machine and transmitted to the first virtual machine, said method comprising:
   upon receipt of the print data by the first virtual machine, determining whether or not the print data can be handled by the first virtual machine; and
   upon determining that the print data cannot be handled by the first virtual machine, transmitting the print data to the client computing device without issuing a print instruction to print the print data locally at the first virtual machine.

2. The method of claim 1, further comprising:
   upon determining that the print data can be handled by the first virtual machine, issuing the print instruction to print the print data locally at the first virtual machine.

3. The method of claim 1, wherein
   the client computing device is a physical machine running a first remote desktop client, and the first virtual machine is running a second remote desktop client and a first remote desktop agent in communication with the first remote desktop client to establish the first remote desktop session, and
   the second virtual machine is running a second remote desktop agent in communication with the second remote desktop client to establish the second remote desktop session.

4. The method of claim 3, wherein
   when the first remote desktop session is established, the printer attached locally to the client computing device is installed as a local printing device in the first virtual machine and indicated as being associated with the client computing device in a first data structure, which is maintained by the first virtual machine, and
   when the second remote desktop session is established, the printer attached locally to the first virtual machine is installed as a local printing device in the second virtual machine and indicated as being associated with the first virtual machine in a second data structure, which is maintained by the second virtual machine.

5. The method of claim 4, wherein
   the print data is generated in the second virtual machine in response to a print instruction issued to the local printing device of the second virtual machine, and
   if a printing destination of the print data at the first virtual machine is not indicated as being associated with the first virtual machine in the first data structure, no print instruction is issued to the local printing device of the first virtual machine between a first point in time at which the print data is received from the second virtual machine and a second point in time at which the print data is transmitted to the client computing device.

6. The method of claim 5, wherein
   the client computing device, the first virtual machine, and the second virtual machine have installed therein first, second, and third printer drivers, respectively, and
   if the printing destination of the print data at the first virtual machine is not indicated as being associated with the first virtual machine in the first data structure, the second printer driver does not operate on the print data between the first point in time and the second point in time.

7. The method of claim 6, wherein the third printer driver is executed in response to the print instruction issued to the local printing device of the second virtual machine to generate the print data and the first printer driver is executed to print the print data at the printer attached locally to a client computing device.

8. The method of claim 5, wherein
   the first data structure associates each of first and second printing destinations with a universally unique ID of the client computing device, and
   if the printing destination of the print data is indicated as either the first printing destination or the second printing destination, no print instruction is issued to the local printing device of the first virtual machine between the first point in time and the second point in time, because neither the first printing destination nor the second printing destination is associated with the universally unique ID of the first virtual machine device in the first data structure.

9. The method of claim 1, wherein the first remote desktop session provisions a first remote desktop and the second remote desktop session is launched from within the first remote desktop and provisions a second remote desktop within the first remote desktop.

10. A non-transitory computer readable medium having instructions stored therein which are executable by a processor to carry out a method of processing print data to be printed at a printer attached locally to a client computing device that has established a first remote desktop session with a first virtual machine that has established a second remote desktop session with a second virtual machine, wherein the print data is generated at the second virtual machine and transmitted to the first virtual machine, said method comprising:
   upon receipt of the print data at the first virtual machine, determining whether or not the print data can be handled by the first virtual machine; and
   upon determining that the print data cannot be handled by the first virtual machine, transmitting the print data to the client computing device without issuing a print instruction to print the print data locally at the first virtual machine.

11. The non-transitory computer readable medium of claim 10, wherein the method further comprises:
   upon determining that the print data can be handled by the first virtual machine, issuing the print instruction to print the print data locally at the first virtual machine.

12. The non-transitory computer readable medium of claim 10, wherein
   the client computing device is a physical machine running a first remote desktop client, and the first virtual machine is running a second remote desktop client and a first remote desktop agent in communication with the first remote desktop client to establish the first remote desktop session, and the second virtual machine is running a second remote desktop agent in communication with the second remote desktop client to establish the second remote desktop session.

13. The non-transitory computer readable medium of claim 12, wherein
when the first remote desktop session is established, the printer attached locally to the client computing device is installed as a local printing device in the first virtual machine and indicated as being associated with the client computing device in a first data structure, which is maintained by the first virtual machine, and
when the second remote desktop session is established, the printer attached locally to the first virtual machine is installed as a local printing device in the second virtual machine and indicated as being associated with the first virtual machine in a second data structure, which is maintained by the second virtual machine.

14. The non-transitory computer readable medium of claim 13, wherein
the print data is generated in the second virtual machine in response to a print instruction issued to the local printing device of the second virtual machine, and
if a printing destination of the print data at the first virtual machine is not indicated as being associated with the first virtual machine in the first data structure, no print instruction is issued to the local printing device of the first virtual machine between a first point in time at which the print data is received from the second virtual machine and a second point in time at which the print data is transmitted to the client computing device.

15. The non-transitory computer readable medium of claim 14, wherein
the client computing device, the first virtual machine, and the second virtual machine have installed therein first, second, and third printer drivers, respectively, and
if the printing destination of the print data at the first virtual machine is not indicated as being associated with the first virtual machine in the first data structure, the second printer driver does not operate on the print data between the first point in time and the second point in time.

16. The non-transitory computer readable medium of claim 15, wherein the third printer driver is executed in response to the print instruction issued to the local printing device of the second virtual machine to generate the print data and the first printer driver is executed to print the print data at the printer attached locally to a client computing device.

17. The non-transitory computer readable medium of claim 14, wherein
the first data structure associates each of first and second printing destinations with a universally unique ID of the client computing device, and
if the printing destination of the print data is indicated as either the first printing destination or the second printing destination, no print instruction is issued to the local printing device of the first virtual machine between the first point in time and the second point in time, because neither the first printing destination nor the second printing destination is associated with the universally unique ID of the first virtual machine device in the first data structure.

18. The non-transitory computer readable medium of claim 10, wherein the first remote desktop session provisions a first remote desktop and the second remote desktop session is launched from within the first remote desktop and provisions a second remote desktop within the first remote desktop.

19. A remote desktop computer system comprising:
a client computing device having a first remote desktop client running therein and a printer locally attached thereto;
a first virtual machine having a second remote desktop client and a first remote desktop agent running therein, wherein the first remote desktop agent is in communication with the first remote desktop client to provision a first remote desktop; and
a second virtual machine having a second remote desktop agent running therein, wherein the second remote desktop agent is in communication with the second remote desktop client to provision a second remote desktop within the first remote desktop, wherein
upon receipt of the print data at the first virtual machine, the first virtual machine determines whether or not the print data can be handled by the first virtual machine, and
upon determining that the print data cannot be handled by the first virtual machine, the first virtual machine transmits the print data to the client computing device without issuing a print instruction to print the print data locally at the first virtual machine.

20. The system of claim 19, wherein
when the first remote desktop session is established, the printer attached locally to the client computing device is installed as a local printing device in the first virtual machine and indicated as being associated with the client computing device in a first data structure, which is maintained by the second computer device, and when the second remote desktop session is established, the printer attached locally to the first virtual machine is installed as a local printing device in the second virtual machine and indicated as being associated with the first virtual machine in a second data structure, which is maintained by the third computer device, and
the first data structure associates each of first and second printing destinations with a universally unique ID of the client computing device, such that if the printing destination of the print data is indicated as either the first printing destination or the second printing destination, the first virtual machine transmits the print data to the client computing device without issuing the print instruction to print the print data locally at the first virtual machine, upon determining that neither the first printing destination nor the second printing destination is associated with the universally unique ID of the first virtual machine device in the first data structure.

* * * * *